(12) United States Patent
Rengan

(10) Patent No.: US 6,204,637 B1
(45) Date of Patent: Mar. 20, 2001

(54) METHOD AND SYSTEM FOR REMOTELY SUPPLYING POWER THROUGH AN AUTOMATED POWER ADAPTER TO A DATA PROCESSING SYSTEM

(75) Inventor: Marco Michael Rengan, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/270,334

(22) Filed: Mar. 16, 1999

(51) Int. Cl.$^7$ .................. H02J 7/00; H02J 9/00
(52) U.S. Cl. ........................... 320/137; 307/150
(58) Field of Search .................. 320/107, 137; 307/126, 130, 131, 150

(56) References Cited

U.S. PATENT DOCUMENTS

| 5,392,438 | 2/1995 | Gunji . | |
|---|---|---|---|
| 5,504,413 | * 4/1996 | Fernandez et al. | 320/163 |
| 5,532,935 | 7/1996 | Ninomiya et al. . | |
| 5,565,714 | * 10/1996 | Cunningham | 307/112 |
| 5,629,602 | 5/1997 | Makino . | |
| 5,642,004 | * 6/1997 | Bircher | 307/66 |
| 5,698,964 | 12/1997 | Kates et al. . | |
| 5,783,927 | 7/1998 | Chen . | |
| 5,818,200 | 10/1998 | Cummings et al. . | |
| 5,825,100 | 10/1998 | Kim . | |

* cited by examiner

Primary Examiner—Peter S. Wong
Assistant Examiner—Gregory J Toatley, Jr.
(74) Attorney, Agent, or Firm—Bernard D. Bogdon; Andrew Dillon

(57) ABSTRACT

A method and system for supplying external electrical power to charge a battery within a data processing system by utilizing a automated remotely located power adapter is disclosed. The automated remotely located power adapter includes a state control logic circuit for determining when to supply external electrical power to charge the battery and an auto-close detection circuit for automatically shutting on and off the external electrical power in response to the state control logic. The automated remotely located power adapter is connectable between the external power supply and the data processing system for supplying external electrical power to charge the battery within the data processing system and automatically shuts off the external electrical power when the data processing system indicates that the battery is fully charged.

17 Claims, 3 Drawing Sheets

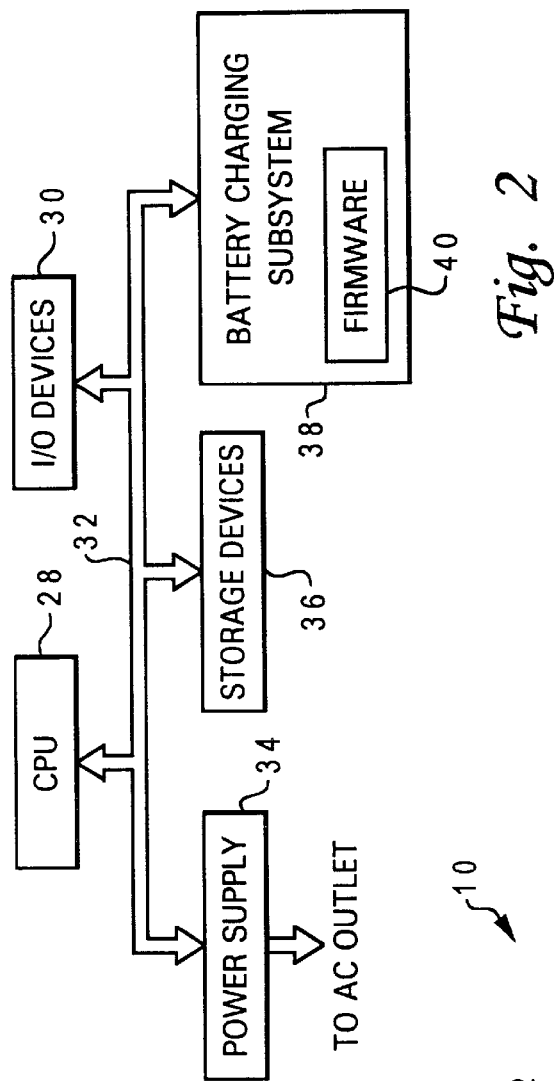
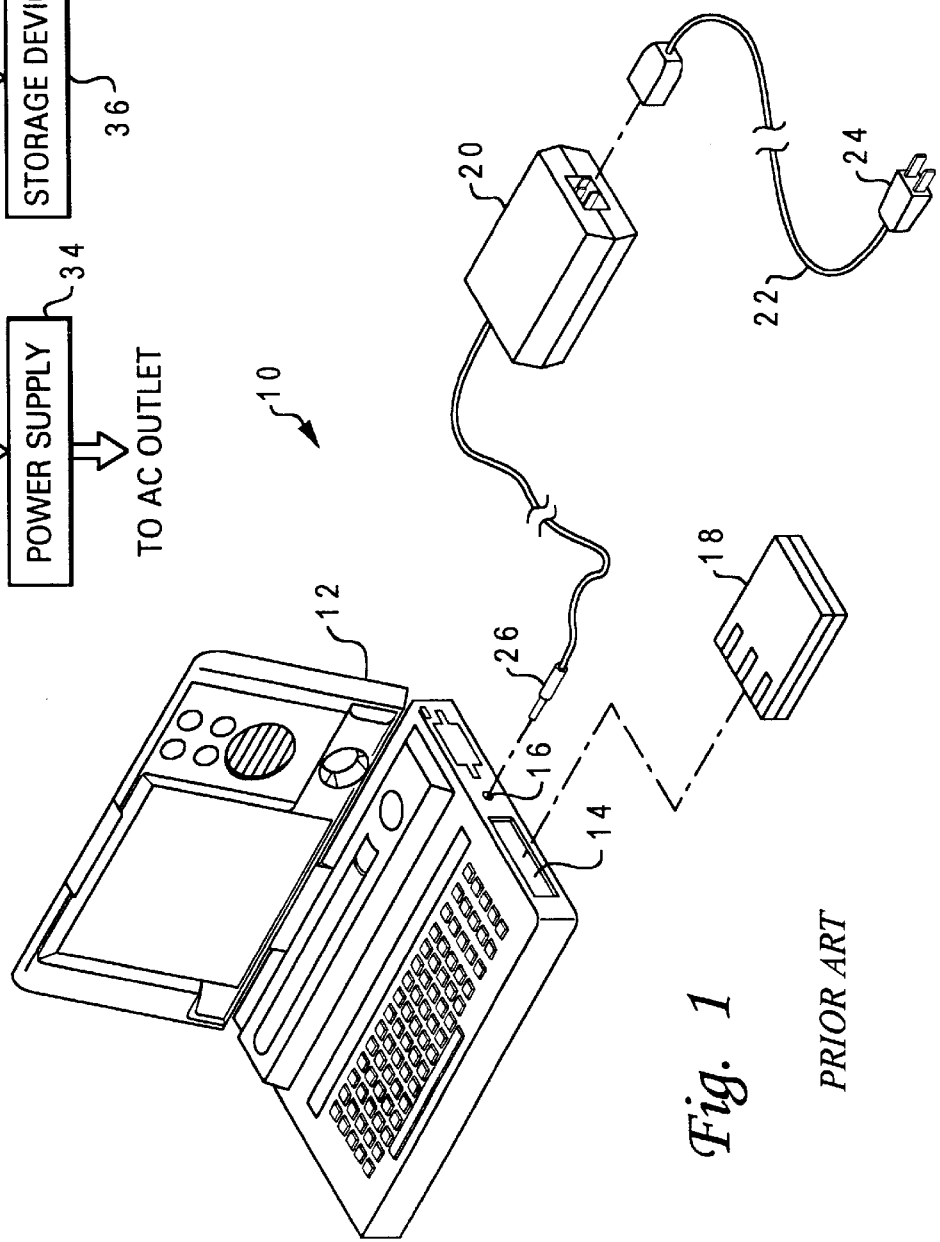
Fig. 1 PRIOR ART
Fig. 2

METHOD AND SYSTEM FOR REMOTELY SUPPLYING POWER THROUGH AN AUTOMATED POWER ADAPTER TO A DATA PROCESSING SYSTEM

BACKGROUND OF THE INVENTION

1. Technical Field

The present invention relates in general to a method and system for data processing and in particular to an improved method and system for automatically shutting off power to a battery in a data processing system when the battery is fully charged. Still more particularly, the present invention relates to a method and system for automatically shutting off power to a battery in a data processing system utilizing a remotely located power adapter.

2. Description of the Related Art

Power adapters used with portable computers produce power continuously upon connection to a wall outlet, whether or not the portable computer is connected to the power adapter. This power production creates an unnecessary waste, especially when users leave their adapters semi-permanently connected either to a docking device or a multi-port adapter. Further, this can be a safety hazard due to heat dissipated by these devices.

Consequently, it would be desirable to provide a power adapter that automatically shuts off after the portable computer's battery is fully charged, or leaves itself on when the portable computer is being used, and then turns off when the portable computer is either disconnected or turned off. The subject invention herein solves all of these problems in a new and unique manner that has not been part of the art previously.

SUMMARY OF THE INVENTION

It is therefore one object of the present invention to provide an improved method and system for a power adapter that automatically shuts power off to a battery when the battery is fully charged.

It is another object of the present invention to provide an improved method and system for a power adapter that prevents unnecessary power drain while simultaneously preventing devices from overheating.

The foregoing objects are achieved as is now described. A method and system for supplying external electrical power to charge a battery within a data processing system by utilizing an automated remotely located power adapter is disclosed. The automated remotely located power adapter includes a state control logic circuit for determining when to supply external electrical power to charge the battery and an auto-close detection circuit for automatically shutting on and off the external electrical power in response to the state control logic. The automated remotely located power adapter is connectable between the external power supply and the data processing system for supplying external electrical power to charge the battery within the data processing system and automatically shuts off the external electrical power when the data processing system indicates that the battery is fully charged.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a perspective view of a power supply configuration employed by a portable data processing system;

FIG. 2 is a system block diagram of the portable data processing system of FIG. 1;

DESCRIPTION OF ILLUSTRATIVE EMBODIMENT

Figure 3:
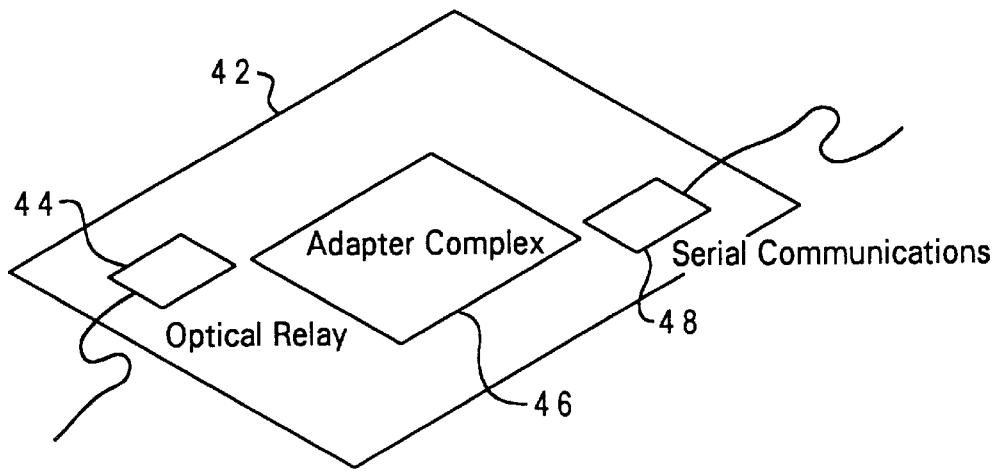
FIG. 3 is a circuit layout depicting features for one embodiment for an automated power adapter in accordance with the present invention.

With reference now to the figures and in particular with reference to FIG. 1, there is illustrated a conventional power supply configuration 10 for a portable data processing system 12 that may be used with the method and system of the present invention. The portable data processing system 12 may be a portable notebook or ThinkPad computer owned and manufactured by the IBM Corporation of Armonk, N.Y. The portable data processing system 12 is generally provided with two kinds of sources of DC current input. Referring to FIG. 1, the portable data processing system 12 has a battery compartment 14 to receive a battery pack 18 to be installed therein to provide battery DC power. The portable data processing system 12 further has a DC input pin socket 16 to receive a DC power from an AC/DC power adapter 20 via a DC power plug 26 for plugging into the socket 16 on the portable data processing system 12. The AC/DC adapter 20 is then connected via an electric cord 22 and an electric plug 24 to an AC power outlet socket (not shown) for providing external power to the portable data processing system 12.

The conventional power supply configuration 10 as shown in FIG. 1 when using current AC/DC power adapters has several drawbacks. This is because current AC/DC power adapters produce power continuously once connected to a wall outlet, whether or not the AC/DC power adapter is connected to the portable data processing system 12. The remotely located power adapter 20 of the present invention eliminates the above-described problem by automatically shutting off after the portable data processing system 12 battery 18 is fully charged, or stays on when the portable data processing system 12 is being used, and then turns itself off when the portable data processing system 12 is either disconnected or turned off, as will be more fully described below.

Referring now to FIG. 2, a system block diagram is shown for the portable data processing system 12 in accordance with one embodiment of the present invention. In particular, the portable data processing system 12 includes a central processing unit (CPU) 28, I/O devices, such as a display, a keyboard, a mouse, and associated controllers, collectively designated by a reference numeral 30, battery charging subsystem 38 and a power supply 34 interconnected via one or more buses, shown collectively in FIG. 2 as a bus 32. A power supply 34 is connectable to an AC wall outlet (not shown) via the AC/DC adapter 20 for drawing operating power therefrom. In accordance with a preferred embodiment of the present invention, battery charging subsystem 38 includes firmware 40 which will send signals to the remotely located power adapter 20 indicating the charge state of battery pack 18, i.e. either fully charged or below a fully charged state.

Turning now to FIG. 3, there is depicted a circuit layout 42 housed within the remotely located power adapter 20 showing components used to implement the present invention. More specifically, a serial communications port 48 for receiving signals from the portable data processing system 12, adapter complex 46 consisting of the transformers and rectifiers to perform the AC to DC transition and an optical relay switch 44 for connection to a power supply are shown. In order to detect the presence of the portable data processing system 12, a unique signal is required and may be provided by the firmware 40 shown in FIG. 2. This signal can be implemented in a variety of ways, for example, it could be a single line that sends a "1" to serial communications port 48 when the portable data processing system 12 is connected and the battery pack 18 is not fully charged thereby closing optical relay switch 44 allowing power to flow to the battery pack 18 and a "0" when the portable data processing system 12 is disconnected or the battery pack 18 is in a fully charged state thereby opening optical relay switch 44 preventing power flow to the battery pack 18.

Figure 4:
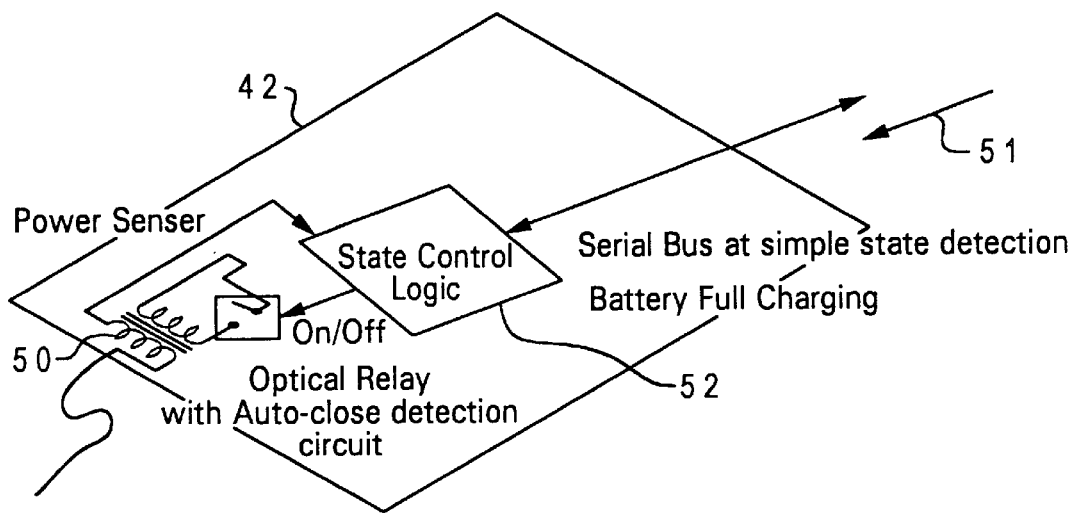
FIG. 4 is a circuit layout depicting features for another embodiment for an automated power adapter in accordance with the present invention.

Turning now to FIG. 4, there is depicted another circuit layout 42 housed within the remotely located power adapter 20 showing components used to implement the present invention. More specifically, a serial bus 51 brings in the signals to a state control logic circuitry 52 from the portable data processing system 12, and an optical relay with auto-close detection circuitry 50 is connected to a power supply (not shown). This circuit layout still performs the same logic as described before but may also be part of a more complex data stream if a serial data path is used to transport the signal to the AC/DC adapter 20 for a truly smart adapter. Essentially, the state control logic circuit 51 within the remotely located power adapter 20 determines from the incoming signals supplied by the firmware 40 when to allow external electrical power to charge the battery pack 18. The auto-close detection circuit 50 automatically shuts on and off the external electrical power in response to the state control logic 52.

Additionally, it should be understood that the portable data processing system 12 may be housed within a docking station (not shown) with the docking station connected to the remotely located power adapter 20, the signal should indicate that the portable data processing system 12 is present in the docking station. It is imperative then that the signal or a derivative of the signal sent by the portable data processing system 12 through the docking station is received at the remotely located power adapter 20.

Figure 5:
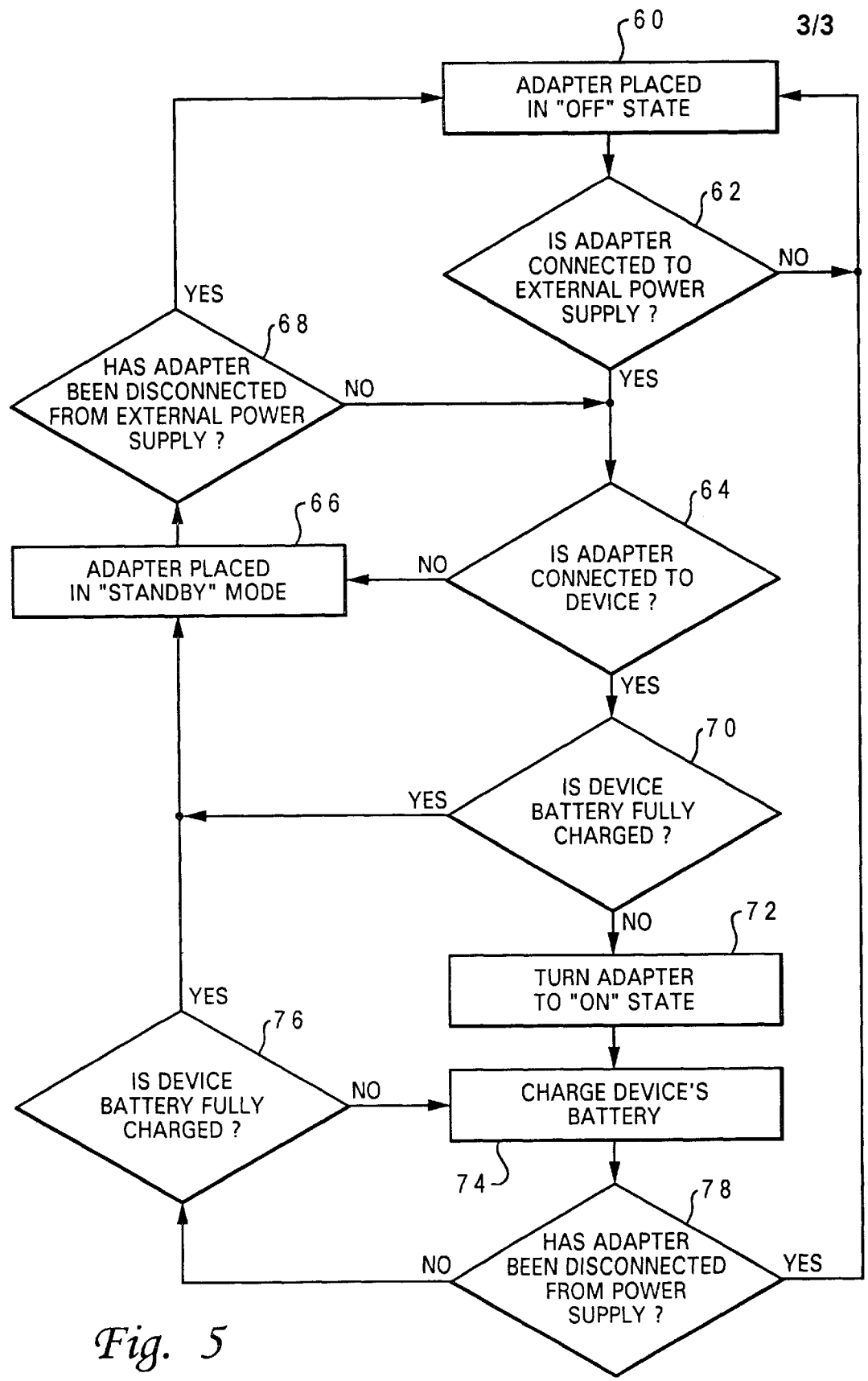
FIG. 5 is a flowchart depicting the operation of the power adapter in accordance with the present invention.

FIG. 5 depicts a flowchart showing the method for remotely supplying electrical power through the remotely located power adapter 20 to the portable data processing system. Referring to FIG. 5, the adapter is initially in an "Off" state in step 60 when it is neither connected between an external power supply and the portable data processing system 12. As shown in step 62, the remotely located adapter 20 stays in the "Off" state until connected to an external power supply. When the remotely located adapter 20 is connected to the external power supply, it is then checked in step 64 to determine whether or not it is connected to a portable data processing system 12. When the remotely located adapter 20 is connected, the battery pack 18 is checked by the remotely located adapter 20 circuitry 42 by receiving a signal from the firmware, 40 to determine if the battery pack 18 is fully charged. As shown in FIG. 5, if the remotely located adapter 20 is not connected to the data processing system 12 or the battery pack 18 is fully charged, the remotely located adapter 20 is placed in a "Standby" mode, shown in step 66. Next, in step 68, the remotely located adapter 20 is checked to determine whether or not it has been disconnected from the external power supply. If it has been disconnected, the method returns to step 60, with the remotely located adapter 20 placed in the "Off" state. If the remotely located adapter 20 has not been disconnected from the external power supply, the method continues to repeat steps 64 and/or 70, as shown in FIG. 5.

In step 70, if the battery pack is not fully charged, the method proceeds to step 72, wherein the remotely located adapter 20 is placed in the "On" state using circuitry 42, and the battery pack 18 is supplied with external electrical power and begins to charge, as shown in steps 72 and 74. When the remotely located adapter 20 is disconnected from the external power supply during charging, the remotely located adapter 20 is placed in the "Off" state as shown in steps 78 and 60. If the remotely located adapter 20 is allowed to supply charge, the circuitry monitors the remote data processing system 12 for a signal indicating that the battery pack is fully charged, as shown by the loop of steps 74, 78 and 76. As shown in FIG. 5, when the battery pack 18 is fully charged the remotely located adapter 20 is placed in a "Standby" mode, shown in step 66. The method then proceeds to step 68, wherein the remotely located adapter 20 is checked to see if it has been disconnected from the external power supply. If it has been disconnected, the method returns to step 60, with the remotely located adapter 20 placed in the "Off" state. If the remotely located adapter 20 has not been disconnected from the external power supply, the method continues to repeat steps 64 and/or 70, as shown in FIG. 5.

Therefore, it should be appreciated that the novelty of the present invention is a remotely located power adapter having an ability to turn on and off in conformity with to a battery pack's charge state. While the invention has been particularly shown and described with reference to a preferred embodiment, it will be understood by those skilled in the art that various changes in form and detail may be made therein without departing from the spirit and scope of the invention.

What is claimed is:

1. A method for supplying electrical power to a data processing system, said method comprising the steps of:

charging an internal battery within a data processing system by a power adapter external to said data processing system, wherein said power adapter is located between an external power supply and said data processing system;

sending an indication from said data processing system to said power adapter to indicate that said internal battery is fully charged; and in response to said indication, automatically shutting off said external power supply utilizing said power adapter.

2. The method according to claim 1, wherein said method further comprises the steps of:

automatically placing said power adapter in standby mode and periodically checking said data processing system for an indication that said battery is not fully charged wherein said remotely located power adapter turns on thereby allowing said power supply to charge said battery.

3. The method according to claim 1, wherein said method further comprises the step of automatically shutting off said external electrical power utilizing said remotely located power adapter when said data processing system is de-coupled from said remotely located power supply, thereby placing said remotely located power adapter in an off state.

4. The method according to claim 3, wherein said method further comprises the step of automatically supplying said power supply to charge said battery utilizing said remotely located power adapter when said data processing system is re-coupled to said remotely located power supply, thereby placing said remotely located power adapter in an on state.

5. The method according to claim 1, wherein said method further comprises the step of automatically entering and remaining in an on state for supplying said power supply to charge said battery when said external power supply is coupled to said remotely located power supply.

6. The method according to claim 1, wherein said method further comprises the step of utilizing state control logic within said remotely located power adapter for detecting a state change delivered from said data processing system for determining when to supply said power supply to charge said battery.

7. The method according to claim 6, wherein said method further comprises the step of utilizing an auto-close detection circuit in association with said state control logic within said remotely located power adapter for shutting on and off said power supply to charge said battery.

8. The method according to claim 1, wherein said method further comprises the step of providing a signal from a serial interface to said remotely located power adapter to indicate to said remotely located power adapter a coupling state between said data processing system and said remotely located power adapter.

9. A system for supplying electrical power to a data processing system having an internal battery, comprising:
- an external power supply for supplying external electrical power to charge said internal battery via a power adapter coupled between an external power supply and said data processing system;
- input means within said remotely located power adapter for receiving an indication from said data processing system that said internal battery is fully charged; and
- means for automatically shutting off said external electrical power utilizing said remotely located power adapter in response to said indication.

10. The system for according to claim 9, further comprising:
- means for automatically placing said remotely located power adapter in a standby mode; and
- means for periodically checking said data processing system for an indication that said battery is not fully charged, wherein said remotely located power adapter turns on thereby allowing said external electrical power to charge said internal battery.

11. The system according to claim 9, further comprising means for automatically shutting off said external electrical power utilizing said remotely located power adapter when said data processing system is de-coupled from said remotely located power supply thereby placing said remotely located power adapter in an off state.

12. The system according to claim 11, further comprising means for automatically supplying said external electrical power to charge said internal battery utilizing said remotely located power adapter when said data processing system is re-coupled to said remotely located power supply thereby placing said remotely located power adapter in an on state.

13. The system for according to claim 9, further comprising means for automatically entering and remaining in an on state for supplying said external electrical power to charge said internal battery when said external power supply is coupled to said remotely located power supply.

14. The system according to claim 9, further comprising means for detecting a state change delivered from said data processing system utilizing state control logic within said remotely located power adapter for determining when to supply said external electrical power to charge said internal battery.

15. The system according to claim 9, further comprising means for shutting on and off said external electrical power utilizing an auto-close detection circuit in association with said state control logic within said remotely located power adapter to charge said internal battery.

16. The system according to claim 1, further comprising means for indicating to said remotely located power adapter a coupling state between said data processing system and said remotely located power adapter by said data processing system providing a signal from a serial interface to said remotely located power adapter.

17. A circuit for remotely supplying electrical power, comprising:
- a remotely located power adapter connectable between an external power supply and a data processing system for supplying external electrical power to charge a battery within said data processing system;
- input means for receiving an indication of whether or not to supply said external electrical power to charge said battery
- a state control logic circuit, coupled to said input means, disposed within said remotely located power adapter for receiving said indication; and
- an auto-close detection circuit, coupled to said state control logic, disposed within said remotely located power adapter for automatically shutting on and off said external electrical power in response to said state control logic.

* * * * *